United States Patent
Wojcik et al.

(10) Patent No.: US 11,522,412 B2
(45) Date of Patent: Dec. 6, 2022

(54) MOUNTING ARRANGEMENTS FOR GAS TURBINE ENGINE ACCESSORIES

(71) Applicant: Hamilton Sundstrand Corporation, Charlotte, NC (US)

(72) Inventors: Craig J. Wojcik, Evansville, WI (US); Ted A. Martin, Winnebago, IL (US); Paul Henry Verstrate, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 469 days.

(21) Appl. No.: 16/245,790

(22) Filed: Jan. 11, 2019

(65) Prior Publication Data

US 2019/0363610 A1 Nov. 28, 2019

Related U.S. Application Data (60) Provisional application No. 62/675,974, filed on May 24, 2018.

(51) Int. Cl.
*H02K 7/18* (2006.01)
*F02C 7/32* (2006.01)
*H02K 5/20* (2006.01)

(52) U.S. Cl.
CPC ............. *H02K 7/1823* (2013.01); *F02C 7/32* (2013.01); *H02K 5/207* (2021.01)

(58) Field of Classification Search
CPC ........ F02C 7/32; F01D 25/28; F05D 2220/76; F05D 2240/90; F05D 2260/31; F05D 2260/39; F05D 2260/764; H02K 7/1823; H02K 5/20
See application file for complete search history.

(56) References Cited

U.S. PATENT DOCUMENTS

| | | | |
|---|---|---|---|
| 2,460,502 A | 2/1949 | Heintz | |
| 2,699,343 A * | 1/1955 | Troeger | F02B 67/00 285/410 |
| 5,178,483 A * | 1/1993 | Wang | F16D 1/076 403/286 |
| 5,267,433 A | 12/1993 | Burch | |
| 7,013,651 B2 | 3/2006 | Bruno et al. | |

(Continued)

FOREIGN PATENT DOCUMENTS

| | | | |
|---|---|---|---|
| EP | 2472083 A2 | 7/2012 | |
| GB | 174526 A * | 2/1922 | ............. F01D 25/28 |

OTHER PUBLICATIONS

Extended European Search Report for International Application No. 19176460.4 dated Oct. 24, 2019, 8 pages.

*Primary Examiner* — Andrew H Nguyen
*Assistant Examiner* — Sean V Meiller
(74) *Attorney, Agent, or Firm* — Cantor Colburn LLP (57) ABSTRACT

A housing for a gas turbine engine accessory includes an enclosure having a drive end with an opening and a closure. The closure is seated in the opening, defines therethrough a shaft aperture and has a v-band flange extending about a periphery of the closure to limit load carried by the enclosure when the engine accessory is mounted to an accessory gearbox mount in a cantilevered arrangement. Engine accessories for gas turbine engines and mounting arrangements for gas turbine engine accessories are also described.

13 Claims, 5 Drawing Sheets

(56) References Cited

U.S. PATENT DOCUMENTS

| | | | |
|---|---|---|---|
| 7,059,136 B2* | 6/2006 | Coffinberry | F02C 6/08 60/226.1 |
| 7,550,881 B1* | 6/2009 | Dietrich | H02K 1/187 310/154.12 |
| 7,737,585 B2* | 6/2010 | Bahr | H02K 5/20 310/54 |
| 2007/0012129 A1* | 1/2007 | Maty | F16H 57/025 74/395 |
| 2009/0180827 A1* | 7/2009 | Katcher | H02K 5/04 403/14 |
| 2009/0190827 A1 | 7/2009 | Katcher | |
| 2013/0207395 A1* | 8/2013 | Huang | H02K 3/30 290/46 |
| 2017/0365993 A1 | 12/2017 | Wagner et al. | |
| 2018/0163845 A1* | 6/2018 | van der Merwe | B64D 33/08 |
| 2020/0153291 A1* | 5/2020 | Van Der Wal | H02K 7/006 |

* cited by examiner

MOUNTING ARRANGEMENTS FOR GAS TURBINE ENGINE ACCESSORIES

CROSS-REFERENCE TO RELATED APPLICATIONS

This application claims priority to U.S. Provisional Application No. 62/675,974, filed on May 24, 2018, the contents of which is incorporated herein by reference in its entirety.

BACKGROUND

Field of the Invention

The invention relates to gas turbine engines, and more particularly to accessories like electrical generators for gas turbine engines.

Description of the Related Art

Accessories are commonly employed on gas turbine engines to provide functionality like starting, lubricant flow and power generation. Such accessories are generally supported by an accessory gearbox, which provides mounting and mechanical power to the various engine accessories. Typically, the drive end of an engine accessory seats to the accessory gearbox at an assigned mounting location such that the engine accessory is cantilevered from the accessory gearbox from the drive end of the engine accessory. Cantilevered mounting can be advantageous for several reasons, e.g., space and accessibility. Cantilevered mounting can also impose certain strength requirements on an engine accessory, e.g., that the accessory housing have strength sufficient to support the weight of the accessory and vibration communicated to the engine accessory at the mounting location, potentially requiring the housing to be relatively large.

Such engine accessories have generally been considered suitable for their intended purpose. However, there remains a need for improved accessory housings, engine accessories, and mounting arrangements for gas turbine engine accessories.

SUMMARY OF THE INVENTION

A housing for a gas turbine engine accessory includes an enclosure having a drive end with an opening and a closure. The closure is seated in the opening, defines therethrough a shaft aperture, and a v-band flange extending about a periphery of the closure to limit load carried by the housing when the engine accessory is mounted to an accessory gearbox mount in a cantilevered arrangement.

In addition to the one or more features described above, or as an alternative, further embodiments may include a v-band seated on the v-band flange and fixing the enclosure to the accessory gearbox mount through the closure.

In addition to the one or more features described above, or as an alternative, further embodiments may include wherein the enclosure is formed from a first material and the closure is formed from a second material, wherein the second material has greater mechanical strength than the first material.

In addition to the one or more features described above, or as an alternative, further embodiments may include wherein the mechanical strength includes at least one of yield strength, tensile strength, and fatigue strength.

In addition to the one or more features described above, or as an alternative, further embodiments may include wherein the enclosure is formed from magnesium or a magnesium alloy.

In addition to the one or more features described above, or as an alternative, further embodiments may include wherein the closure is formed from aluminum or a 7075-family aluminum alloy.

In addition to the one or more features described above, or as an alternative, further embodiments may include two or more fasteners arranged in a fastener pattern extending about the shaft aperture and fixing the closure to the enclosure, wherein the fastener pattern is between the shaft aperture and the v-band flange.

In addition to the one or more features described above, or as an alternative, further embodiments may include an anti-rotation feature arranged between two of the plurality of fasteners, a coolant inlet tube arranged between two of the plurality of fasteners, and one or more coolant outlet tube spaced apart from the coolant inlet tube by one or more fastener.

In addition to the one or more features described above, or as an alternative, further embodiments may include a bearing seated in the closure and supporting a generator rotor with a shaft extending through the shaft aperture.

In addition to the one or more features described above, or as an alternative, further embodiments may include wherein the generator shaft carries windings for generating variable frequency electrical power according rotational speed of the shaft.

In addition to the one or more features described above, or as an alternative, further embodiments may include wherein the closure defines an interior lubricant channel in fluid communication with the shaft aperture and extending radially therefrom.

In addition to the one or more features described above, or as an alternative, further embodiments may include wherein the closure has a mount annular portion extending from a drive face of the closure and extending about the shaft aperture, wherein the drive annular portion has a mount sealing member groove defined within a radially outer periphery of the mount annular portion, and further comprising a mount sealing member seated in the mount sealing member groove and extending about the shaft aperture.

In addition to the one or more features described above, or as an alternative, further embodiments may include wherein the closure has an enclosure annular portion extending from an anti-drive face of the closure and extending about the shaft aperture, wherein the enclosure annular portion has an enclosure sealing member groove defined within a radially outer periphery of the enclosure annular portion, and further comprising an enclosure sealing member seated in the enclosure sealing member groove and extending about the shaft aperture.

An electrical generator includes a housing as described above, a generator rotor with a shaft is supported for rotation within the enclosure, the shaft extending through the shaft aperture of the closure. Two or more fasteners are arranged in a fastener pattern extending about the shaft aperture and fix the closure to the enclosure, the fastener pattern located between the shaft aperture and the v-band flange.

In addition to the one or more features described above, or as an alternative, further embodiments may include wherein the enclosure is formed from magnesium or a magnesium alloy, wherein the closure is formed from aluminum or a 7075-family aluminum alloy.

In addition to the one or more features described above, or as an alternative, further embodiments may include a v-band seated on the v-band flange and fixing the enclosure to an accessory gearbox mount through the closure.

In addition to the one or more features described above, or as an alternative, further embodiments may include wherein the generator is a variable speed constant frequency generator.

A mounting arrangement for a gas turbine engine accessory includes an accessory gearbox with at least one accessory mount, the mount having a v-band flange extending about the accessory mount. An electrical generator as described above is cantilevered from the accessory mount such that the v-band flange of the closure abuts the v-band flange of the accessory mount. A v-band extends about the v-band flange of the accessory mount and the v-band flange of the closure, the v-band compressively fixing the closure against the accessory mount.

Technical effects of embodiments of the present disclosure include providing a generator closure with sufficient strength to support the weight of the generator, provide an oil seal, support the generator rotor, and allow the generator to be secured to an AMAD via a v-band clamp. In certain embodiments the closure strength is provided with a machined aluminum closure, rather than a casting, which can be shot-peened to provide strength sufficient to support the generator.

The foregoing features and elements may be combined in various combinations without exclusivity, unless expressly indicated otherwise. These features and elements as well as the operations thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of an electrical generator having a housing constructed in accordance with the present disclosure is shown FIG. 1 and indicted generally with reference numeral 100. Other embodiments of accessory housings, electrical generators having such housings and mounting arrangements for gas turbine engine accessories in accordance with the disclosure, or aspects thereof, are provided in FIGS. 2-7, as will be described. The accessory housings described herein can be used for mounting accessories to gas turbine engines, such as variable speed constant frequency (VSCF) electrical generators to accessory gearboxes, though the present disclosure is not limited to VSCF electrical generators or to electrical generators in general.

Figure 1:
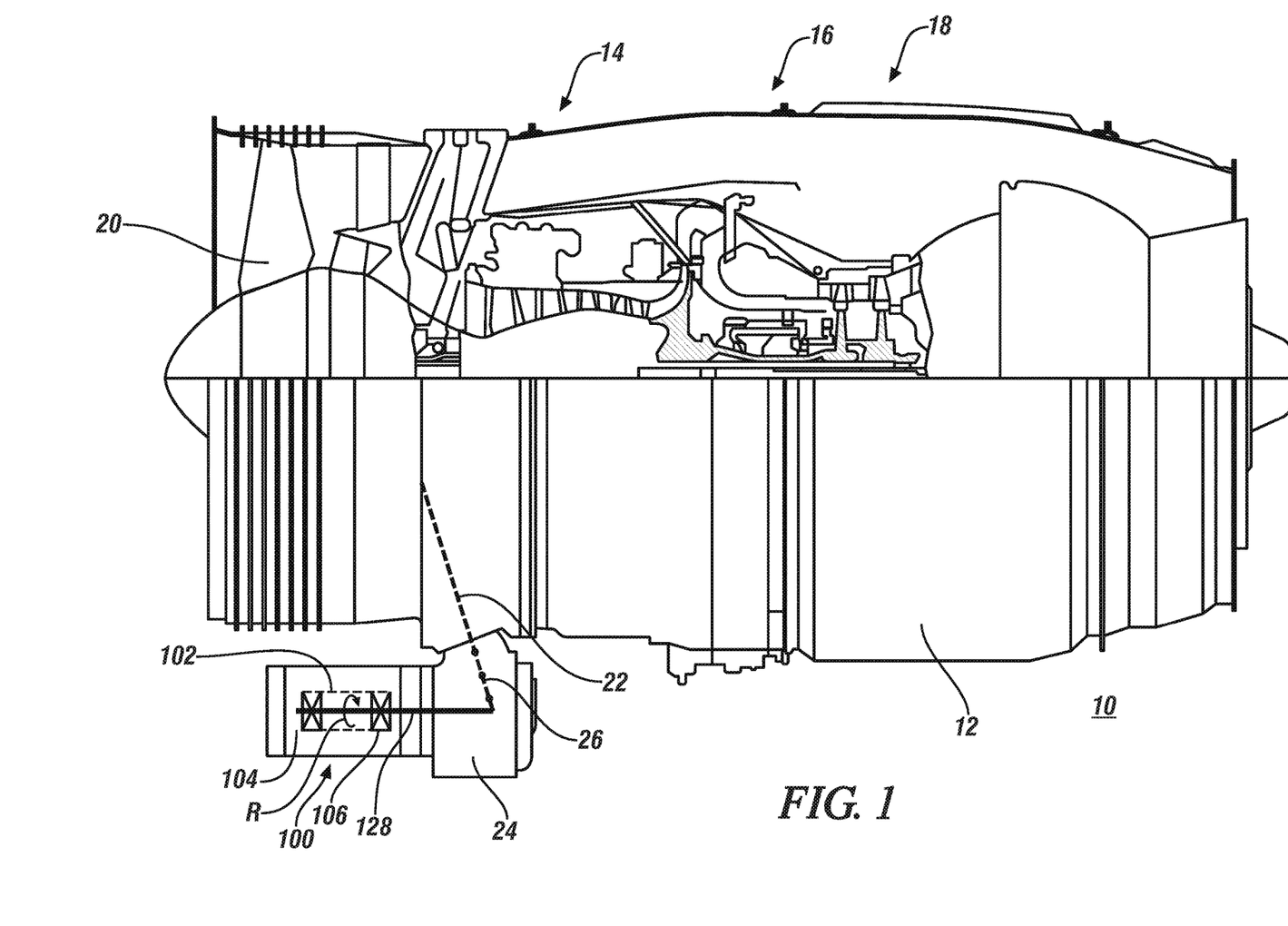
FIG. 1 is partial cross-sectional view of an electrical generator with a housing constructed in accordance with the present disclosure, showing the electrical generator connected to a gas turbine engine and supported by an accessory gearbox in a cantilevered mounting arrangement.

Referring to FIG. 1, a gas turbine engine 10 is shown. Gas turbine engine 10 includes a case 12 enclosing a compressor section 14, a combustion section 16, and a turbine section 18. Compressor section 14 ingests air from the ambient environment, compresses the air and provides the compressed air to combustion section 16. Combustion section 16 generates a flow of high pressure combustion products, which combustion section 16 communicates to turbine section 18. Turbine section 18 expands the high pressure combustion products, extracts the work therefrom and communicates the high pressure combustion products to the ambient environment. Portions of the work are applied to each of compressor section 14, a fan 20 operably associated with turbine section 18, and an electrical generator 100 also operably associated with gas turbine engine 10. As shown and described herein gas turbine engine 10 has a single spool. This is for illustration purposes only and is non-limiting. As will be appreciated by those of skill in the art in view of the present disclosure, gas turbine engines having other architectures, e.g., two spool architectures, can also benefit from the present disclosure.

Electrical generator 100 is operably associated with gas turbine engine 10 through a power take-off shaft 22. More specifically, electrically generator 100 is supported by gas turbine engine 10 at an accessory gearbox 24 and is connected thereto via a gear train 26 and power take-off shaft 22 to turbine section 18. A portion of the work communicated through power take-off shaft 22 and gear train 26 is applied as mechanical rotation R to a rotor 102 of electrical generator 100, which is supported within housing 116 of electrical generator 100 by an anti-drive end bearing 104 and a drive end bearing 106. The connection rotor 102 to gear train 26 can be, for example, via a shaft 128 that is fixed in rotation relative to rotor 102 and arranged to communicate a portion of the work thereto as mechanical rotation R. In certain embodiments electrical generator 100 can be a VSCF electrical generator such as those described in U.S. Patent Application Publication No. 2017/0365993 A1, filed Jun. 15, 2016, the contents of which are incorporated herein by reference in its entirety.

Figure 2:
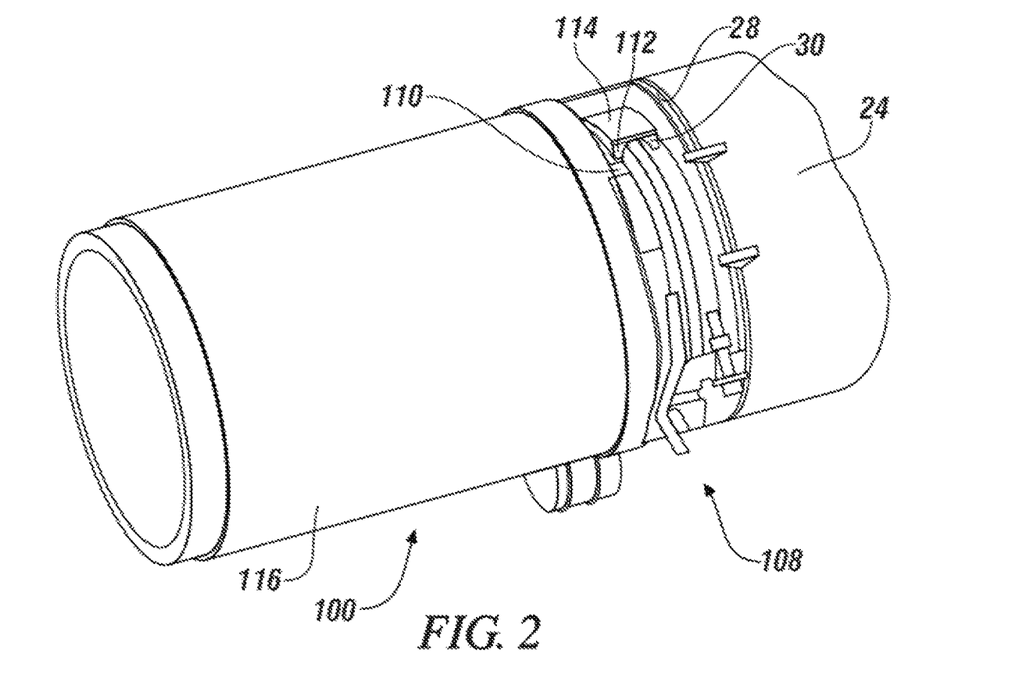
FIG. 2 is a perspective view of the mounting arrangement of FIG. 1, showing the electrical generator fixed to the accessory gearbox at an accessory mount with a v-band.

With reference to FIG. 2, mounting arrangement 108 is shown. Mounting arrangement 108 includes portions of accessory gearbox 24 and electrical generator 100. In this respect accessory gearbox 24 includes an accessory mount 28 having a v-band flange 30 extending a periphery of accessory mount 28. Electrical generator 100 includes a housing 116 having an enclosure 118 and a closure 110 with a v-band flange 112 extending about a periphery of closure 110. V-band flange 112 of closure 110 abuts v-band flange 30 of accessory mount 28 and is fixed thereto by a v-band 114, which compressively fixes closure 110 (and electrical generator 100 therethrough) against accessory mount 28. It is contemplated that v-band 114 can be as described, for example, in U.S. Patent Application Publication No. 2009/0180827 A1 to Katcher, filed Jan. 9, 2009, the contents of which are incorporated herein by reference in its entirety.

Figure 3:
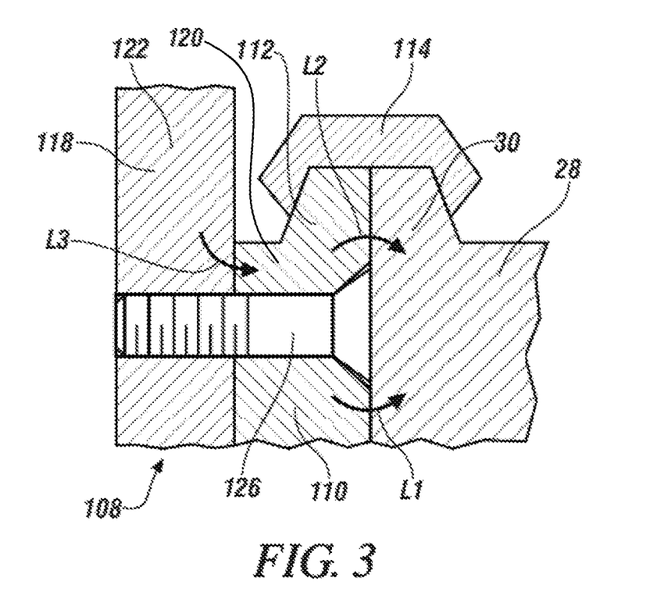
FIG. 3 is a cross-section view of the mounting arrangement of FIG. 1, showing loads communicated to the accessory gearbox through the housing closure.

With reference to FIG. 3, portions of mounting arrangement 108 is shown. As shown in FIG. 3 closure 110 is fastened to enclosure 118 by one or more fastener 126, fastener 126 fixing closure 110 to enclosure 118. Closure 110 is in turn fixed to accessory mount 28 with v-band 114, which is compressively seated about both closure v-band flange 112 and mount v-band flange 30. Compressive seating of closure v-band flange 112 and mount v-band flange 30 causes load $L_1$ (the weight of closure 110) and load $L_2$ (load applied to closure 110 by drive end bearing 106) to be communicated directly to mount 28 by closure 110, bypassing enclosure 118 and limiting the stress within enclosure 118. It is contemplated that load $L_3$ of enclosure 118 as well as load exerted by anti-drive end bearing 104 (shown in FIG. 1) be communicated to mount 28 indirectly, i.e., through enclosure 118.

As will be appreciated by those of skill in the art, direct communication of load L through closure 110 limits load carried by enclosure 118. This allows enclosure 118 to be smaller and/or lighter than would otherwise be required. In certain embodiments closure 110 is formed from a closure material 120 having a greater mechanical strength than an enclosure material 122 forming enclosure 118, allowing closure 110 to support a relatively large rotor with a correspondingly large enclosure—such as in certain VSCF electrical generator arrangements. For example, closure material 120 can have one or more of a yield strength, a tensile strength and/or a fatigue strength that is greater than that of enclosure material 122. In this respect it is contemplated that, in certain embodiments, enclosure material 122 can be magnesium or a magnesium alloy and closure material 120 can be an aluminum alloy, such as a 7075-family aluminum alloy. As will be appreciated by those of skill in the art in view of the present disclosure, 7075-family aluminum alloys have the advantage that strength can be dialed via surface finishing according load and/or vibration level exerted on closure 110—for example by shot peening a machined surface of closure 110 to have a peened finish 124 (shown in FIG. 4) while retaining a common piece part housing, as required for an intended application. It is also contemplated that the closure material 120 can include titanium, steel, or Inconel, as suitable for an intended application.

Figure 4:
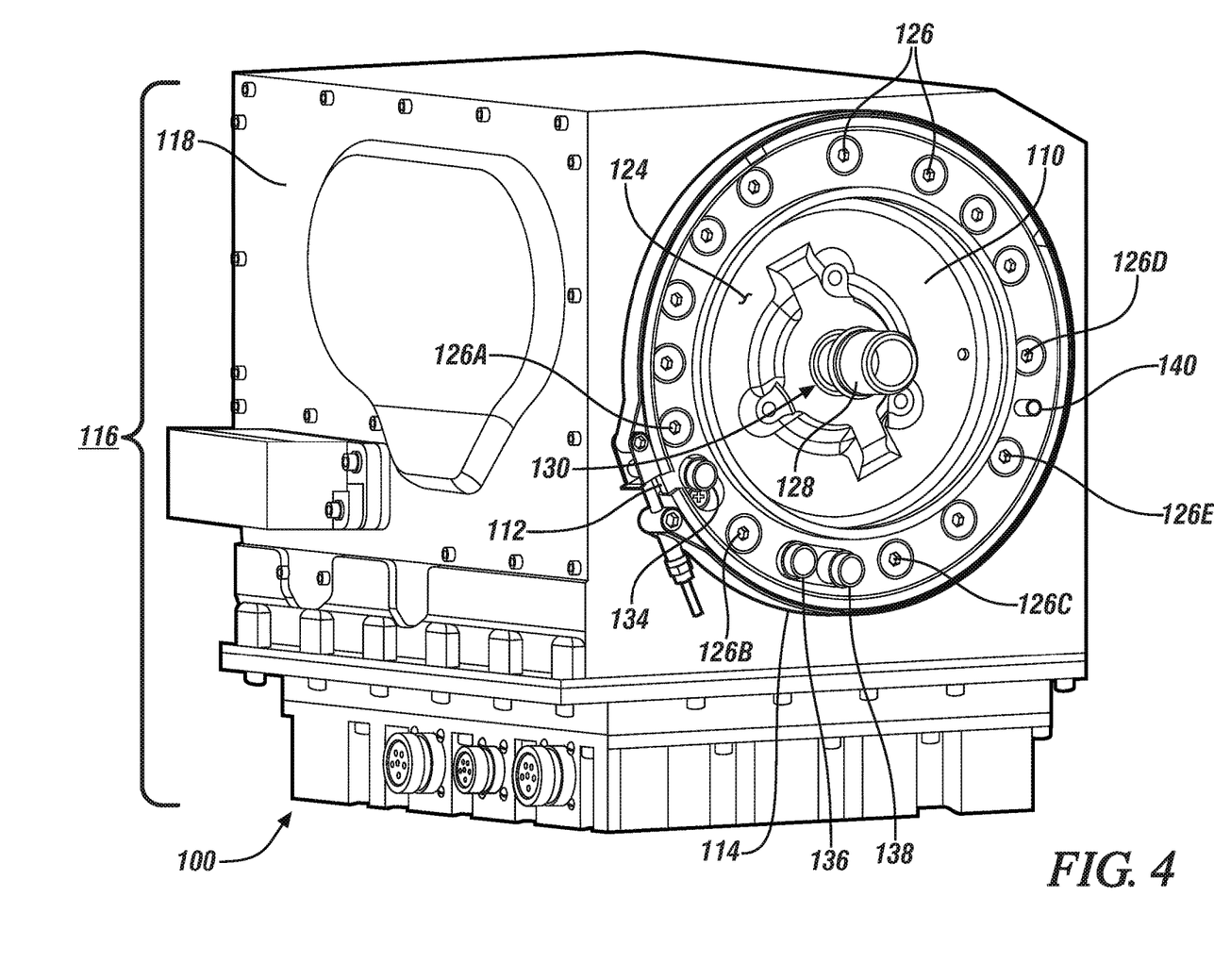
FIG. 4 is a drive-end view of the electrical generator illustrated in FIG. 1 according to an exemplary embodiment, showing the generator housing including an enclosure with an opening and a closure seated in the opening.

With reference to FIG. 4, electrical generator 100 is shown according to an embodiment. Electrical generator 100 includes housing 116, rotor 102 (shown in FIG. 1), fasteners 126, and v-band 114. Shaft 128 is fixed in rotation relative to rotor 102, which is supported for rotation within enclosure 118 with shaft 128 extending through a shaft aperture 130 defined by closure 110. Fasteners 126 are arranged in a fastener pattern 132 (shown in FIG. 4) extending about shaft aperture 130 and fix closure 110 to enclosure 118. Fastener pattern 132 (and fasteners 126) are located radially between shaft aperture 130 and v-band flange 112. In the illustrated exemplary embodiment fourteen (14) fasteners 126 are employed to fix closure 110 to enclosure 118. This is for illustration purposes only and is non-limiting and it is to be understood and appreciated that embodiments of electrical generator 100 can have more that fourteen fasteners or fewer than fourteen fasteners fixing closure 110 to enclosure 118, as suitable for an intended application.

Electrical generator 100 also has a coolant inlet tube 134, a low pressure coolant outlet tube 136, a high pressure coolant outlet tube 138, and an anti-rotation pin 140. Each of coolant inlet tube 134, low pressure coolant outlet tube 136, high pressure coolant outlet tube 138, and anti-rotation pin 140 are circumferentially distributed within fastener pattern 132. In this respect coolant inlet tube 134 is located between a circumferentially first fastener 126A and second circumferentially adjacent fastener 126B, and low pressure coolant outlet tube 136 and high pressure coolant outlet tube 138 are located between circumferentially adjacent second fastener 126B and third fastener 126C. As will be appreciated by those of skill in the art in view of the present disclosure, this limits the number of fasteners require to retain closure 110 to enclosure 118 because compressive engagement of tube keepers respectively seated within closure 110 and fixed to enclosure 118 also function to fix closure 110 to enclosure 118. Anti-rotation pin 140 is similarly located between two circumferentially adjacent fasteners, i.e., fastener 126D and fastener 126E, and fixes closure 110 to enclosure 118 to further limit the number of fasteners 126 required to fix closure 110 to enclosure 118.

Figure 5:
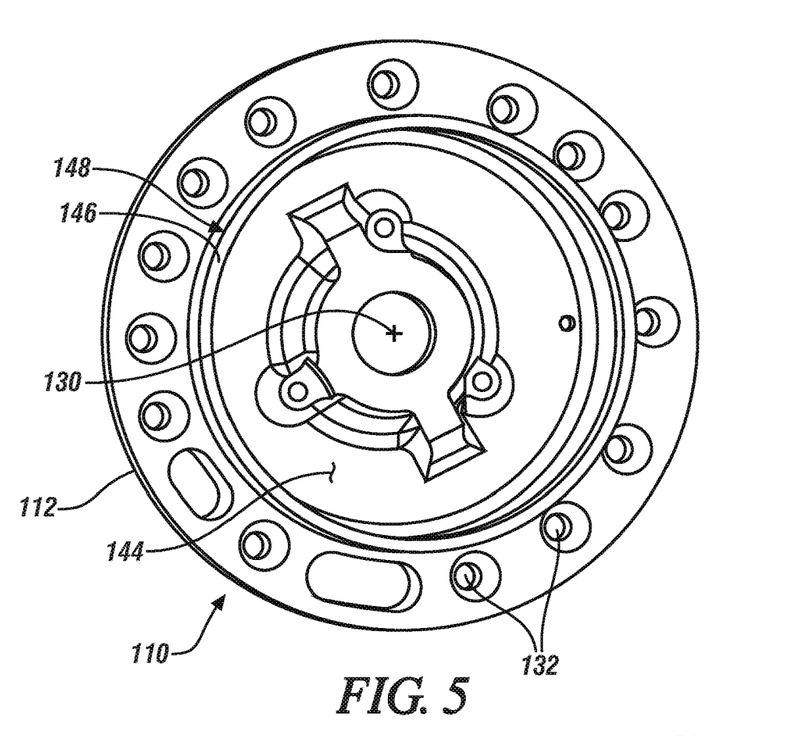
FIG. 5 is perspective view of the closure of the electrical generator illustrated in FIG. 3, showing a drive face of the closure.

With reference to FIG. 5, a drive face 144 of closure 110 is shown. Closure 110 has a disk-like body with an anti-drive face 142 (shown in FIG. 5) and drive face 144. V-band flange 112 extends radially about anti-drive face 142 and drive face 144 at radially outermost location. Fastener pattern 132 is located radially between v-band flange 112 and shaft aperture 130, extends through closure 110 between drive face 144 and anti-drive face 142 for receiving fastener 126 (shown in FIG. 3), and has an axially extending face annular portion 146. Face annular portion 146 extends about shaft aperture 130 and in a direction opposite anti-drive face 142 and has a mount sealing member groove 148 defined therein. Mount sealing member groove 148 extends about shaft aperture 130, is located on a radially outer surface 150 (shown in FIG. 7) of face annular portion 146 and is a configured and adapted to seat therein a mount sealing member 152 (shown in FIG. 7) for sealing electrical generator 100 against accessory mount 28 (shown in FIG. 1).

Figure 6:
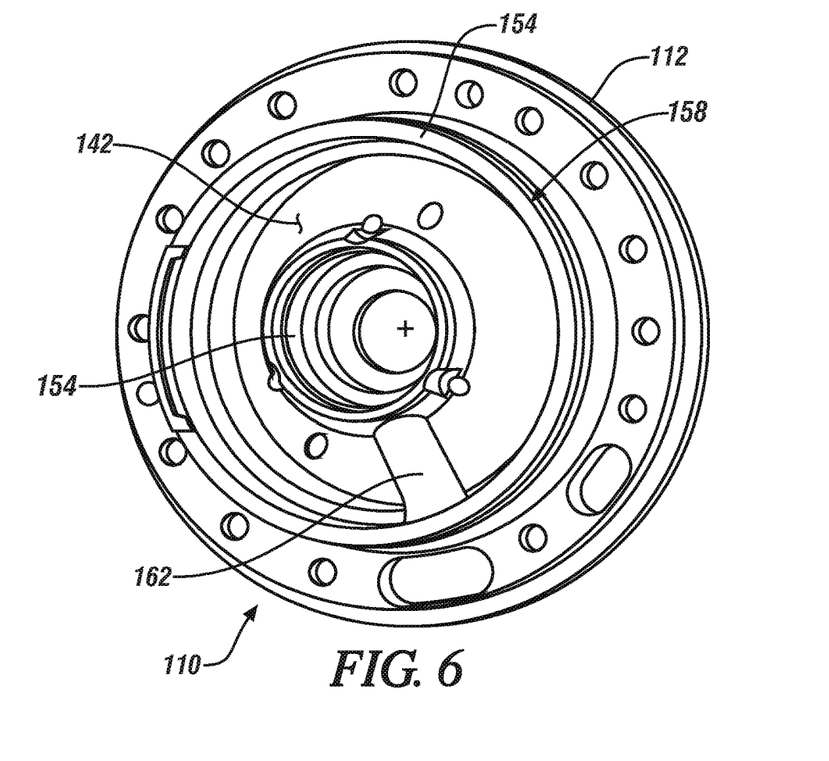
FIG. 6 is perspective view of the closure of the electrical generator illustrated in FIG. 3, showing an anti-drive face of the closure.

With reference to FIG. 6, anti-drive face 142 of closure 110 is shown. Anti-drive face 142 has enclosure annular portion 154 and defines a bearing seat 156. Bearing seat 156 extends about shaft aperture 130 and extends axially therefrom, is arranged to seat therein drive end bearing 106 (shown in FIG. 1), and is located radially between shaft aperture 130 and enclosure annular portion 154. Enclosure annular portion 154 is located radially between bearing seat 156 and v-band flange 112, extends about bearing shaft aperture 130 and axially from anti-drive face 142, and has an enclosure sealing member groove 158 defined therein. Enclosure sealing member groove 158 also extends about shaft aperture 130 and is configured and adapted to seat therein an enclosure sealing member 160 for sealing closure 110 against enclosure 118. An interior lubricant channel 162 extends radially between enclosure annular portion 154 and bearing seat 156 for providing a flow of lubricant therethrough to drive end bearing 106.

Figure 7:
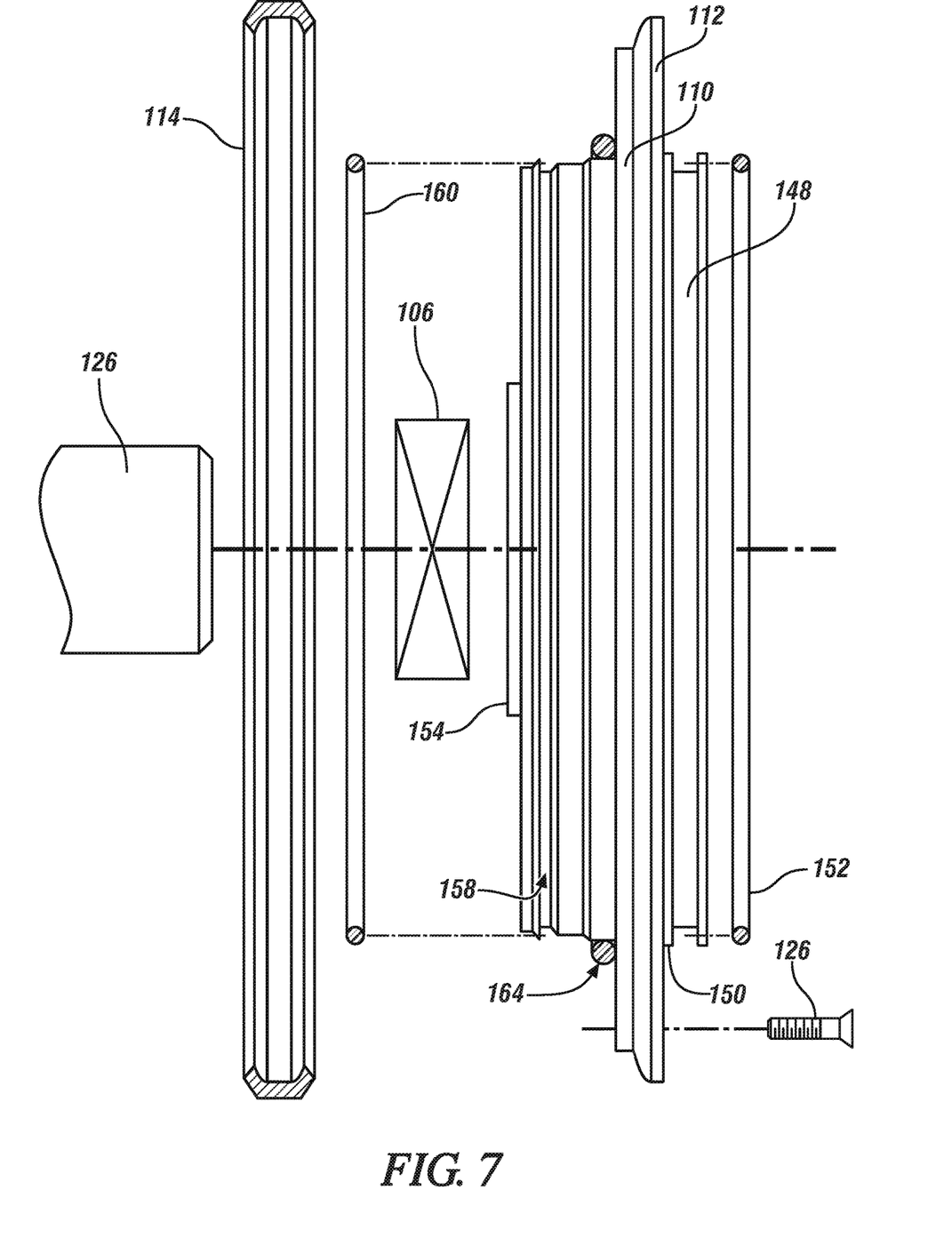
FIG. 7 is a side elevation view of the closure of FIG. 3, showing a bearing and sealing members exploded away from the closure.

With reference to FIG. 7, closure 110 is shown in an exploded view. Drive end bearing 106 seats in bearing seat 156 for rotatably supporting shaft 128, for example with bearing fasteners received through closure 110. Enclosure sealing member groove 158 seats in enclosure sealing member groove 158 for sealing closure 110 against enclosure 118. Mount sealing member 152 seats in mount sealing member groove 148 for sealing closure 110 against accessory mount 28. V-band 114 seats on v-band flange 112 for compressively engaging closure 110 against accessory mount 28. Fasteners 126 are received through apertures of fastener pattern 132 (shown in FIG. 5) and fix closure 110 to enclosure 118 such that load, e.g., one or more of loads $L_1$-$L_3$ (shown in FIG. 3), carried by closure 110 is communicated directly to accessory mount 28 (shown in FIG. 1) through closure 110, and not through enclosure 118, thereby allowing limiting load carried by enclosure 118 and associated stress within enclosure 118. In the illustrated embodiment a second closure sealing member 164 is seated about closure 112 to provide sealing of enclosure 118.

The methods and systems of the present disclosure, as described above and shown in the drawings, provide for as turbine engine accessories with superior properties including limited housing loads in accessories cantilevered from accessory gearbox mounts. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A mounting arrangement for a gas turbine engine accessory, comprising:
    an accessory gearbox with an accessory mount, the accessory mount having a v-band flange extending about the accessory mount;
    an electrical generator that includes a housing that includes: an enclosure having a drive end with an opening; and
    a closure seated in the opening and defining therethrough a shaft aperture, wherein the closure has a v-band flange extending about a periphery of the closure to limit load carried by the housing when the engine accessory is mounted to the accessory mount in a cantilevered arrangement;
    the electrical generator further including:
    a generator rotor with a shaft is supported for rotation within the enclosure, the shaft extending through the shaft aperture of the closure;
    a plurality of fasteners arranged in a fastener pattern extending about the shaft aperture and fixing the closure to the enclosure,
    the fastener pattern located radially between the shaft aperture and the v-band flange of the closure,
    wherein the electrical generator is a variable speed constant frequency generator;
    wherein the electrical generator is cantilevered from the accessory mount and the v-band flange of the closure abuts the v-band flange of the accessory mount; and
    wherein the mounting arrangement further includes:
    a v-band extending about the v-band flange of the accessory mount and the v-band flange of the closure, the v-band compressively fixing the closure against the accessory mount; and
    the closure has a disk body with a drive face on one face of the disk body and an anti-drive face on an axially opposite face of the disk body such that the v-band flange of the closure is axially between its drive face and anti-drive face,
    wherein each of the fasteners is axially aligned with each other of the fasteners and extends axially through the closure, from the drive face to the anti-drive face and into the enclosure, whereby at least a portion of each of the fasteners is axially aligned with the v-band flange;
    wherein the closure has:
    a mount annular portion extending axially from the drive face and annularly about the shaft aperture; and
    an enclosure annular portion extending axially from the anti-drive face and annularly about the shaft aperture.

2. The mounting arrangement of claim 1, further comprising the v-band seated on the v-band flange of the closure and fixing the enclosure to the accessory gearbox mount through the closure.

3. The mounting arrangement of claim 1, wherein the enclosure is formed from a first material and the closure is formed from a second material, wherein the second material has greater mechanical strength than the first material.

4. The mounting arrangement of claim 3, wherein the mechanical strength includes at least one of yield strength, tensile strength, and fatigue strength.

5. The mounting arrangement of claim 1, wherein the enclosure is formed from magnesium or a magnesium alloy.

6. The mounting arrangement of claim 1, wherein the closure is formed from aluminum or a 7075-family aluminum alloy.

7. The mounting arrangement of claim 1, further comprising:
    an anti-rotation feature arranged between two of the plurality of fasteners;
    a coolant inlet tube arranged between two of the plurality of fasteners; and
    at least one coolant outlet tube spaced apart from the coolant inlet tube by one or more fastener of the plurality of fasteners.

8. The mounting arrangement of claim 7, wherein the shaft carries windings for generating variable frequency electrical power according to rotational speed of the shaft.

9. The mounting arrangement of claim 7, wherein the closure defines an interior lubricant channel in fluid communication with the shaft aperture and extending radially therefrom.

10. The mounting arrangement of claim 1, further comprising a bearing seated in the closure and supporting a generator rotor with the shaft extending through the shaft aperture.

11. The mounting arrangement of claim 1, wherein the mount annular portion has a mount sealing member groove defined within a radially outer periphery of the mount annular portion, and further comprising a mount sealing member seated in the mount sealing member groove and extending about the shaft aperture.

12. The mounting arrangement of claim 1, wherein the enclosure annular portion has an enclosure sealing member groove defined within a radially outer periphery of the enclosure annular portion, and further comprising an enclosure sealing member seated in the enclosure sealing member groove and extending about the shaft aperture.

13. The mounting arrangement of claim 1, wherein the enclosure is formed from magnesium or a magnesium alloy, and wherein the closure is formed from aluminum or a 7075-family aluminum alloy.

* * * * *